US008498770B2

(12) United States Patent
Takano

(10) Patent No.: US 8,498,770 B2
(45) Date of Patent: Jul. 30, 2013

(54) VEHICLE PARKING ASSIST SYSTEM AND METHOD

(75) Inventor: Teruhisa Takano, Kawasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 349 days.

(21) Appl. No.: 12/810,258

(22) PCT Filed: Nov. 17, 2008

(86) PCT No.: PCT/JP2008/003341
§ 371 (c)(1), (2), (4) Date: Jun. 23, 2010

(87) PCT Pub. No.: WO2009/081519
PCT Pub. Date: Jul. 2, 2009

(65) Prior Publication Data

US 2010/0274474 A1 Oct. 28, 2010

(30) Foreign Application Priority Data

Dec. 26, 2007 (JP) ................................ 2007-334018

(51) Int. Cl.
*G01C 22/00* (2006.01)

(52) U.S. Cl.
USPC ........................................................ 701/28

(58) Field of Classification Search
USPC ........................... 701/28, 36; 340/932.2, 937
See application file for complete search history.

(56) References Cited

U.S. PATENT DOCUMENTS 7,099,758 B2 8/2006 Tanaka et al.
7,161,616 B1 * 1/2007 Okamoto et al. ............. 348/148
2004/0130464 A1 * 7/2004 Schindler et al. .......... 340/932.2
2006/0274147 A1 12/2006 Chinomi et al.
2007/0057816 A1 * 3/2007 Sakakibara et al. ....... 340/932.2
2007/0273554 A1 * 11/2007 Sakakibara ................ 340/932.2
2007/0279493 A1 * 12/2007 Edanami ....................... 348/148
2008/0077294 A1 3/2008 Danz et al.
2008/0136673 A1 * 6/2008 Jung .......................... 340/932.2

(Continued)

FOREIGN PATENT DOCUMENTS

CN 1964883 A 5/2007
EP 1 038 734 A1 9/2000

(Continued)

OTHER PUBLICATIONS

Takano, US PTO Office Action. U.S. Appl. No. 12/506,569, dated Oct. 7, 2011, 7 pgs.

(Continued)

*Primary Examiner* — James Trammell
*Assistant Examiner* — Michael D Lang
(74) *Attorney, Agent, or Firm* — Foley & Lardner LLP

(57) ABSTRACT

Upon a driver of a vehicle setting a target parking position, a parking assist system calculates a recommended parking start position which the vehicle can reach with a current steering angle of the vehicle unchanged and from which the vehicle can reach the parking target position with a constant steering angle. The parking assist system then draws a parking start frame figure F2 indicating a recommended parking start position on an overhead image around the vehicle generated using images captured by onboard cameras and displays the same on the display unit. It is therefore possible to properly assist the driving operation for parking allow inexperienced drivers to easily perform parking.

10 Claims, 7 Drawing Sheets

U.S. PATENT DOCUMENTS

2008/0174452 A1* 7/2008 Yamamoto et al. ........ 340/932.2
2009/0143967 A1* 6/2009 Lee et al. ...................... 701/119
2010/0019934 A1 1/2010 Takano
2011/0095910 A1 4/2011 Takano

FOREIGN PATENT DOCUMENTS

EP 1 102 226 B1 7/2005
EP 1 862 376 A2 12/2007
EP 1 916 846 A1 4/2008
JP 2002-240662 A 8/2002
JP 2004-25942 A 1/2004
JP 2004-291866 A 10/2004
JP 2005-239048 A 9/2005
JP 2005-329915 A 12/2005
JP 2006-312440 A 11/2006
JP 2007-118922 A 5/2007
JP 2007-230371 A 9/2007
JP 2008-044529 A 2/2008
JP 2008-114776 A 5/2008
JP 2009-143410 A 7/2009
WO WO 2005/120932 A1 12/2005
WO WO 2006/100892 A1 9/2006
WO WO 2007/015446 A 2/2007
WO WO 2009/081519 A1 7/2009

OTHER PUBLICATIONS

T. Takano et al., USPTO Notice of Allowance, U.S. Appl. No. 12/506,569, May 29, 2012, 6 pgs.

* cited by examiner

START
RECEIVE IMAGE OF ONBOARD CAMERA
S21
GENERATE OVERHEAD IMAGE
S22
DRAWN VEHICLE FIGURE
S23
DRAWN PARKING FRAME
S24
DRAWN RECOMMENDED PATH
S25
S26
IS STEERING OPERATION FINISHED ?
YES
NO
DRAW DIRECTION INDICATOR ICON
S27
OUTPUT IMAGE TO DISPLAY DEVICE
S28
RETURN

VEHICLE PARKING ASSIST SYSTEM AND METHOD

TECHNICAL FIELD

The present invention relates to a vehicle parking assist system which assists a driving operation at parking a vehicle and a method thereof.

BACKGROUND ART

As a conventional vehicle parking assist system which assists a driving operation at parking a vehicle, for example, a system disclosed in Japanese Patent Laid-open Publication No. 2005-239048 is known. This system transforms images around the vehicle captured by onboard cameras into an overhead image; and draws and displays on a display device a figure of the vehicle at a position of the vehicle on the overhead image and a parking frame figure at a target parking position set by a driver of the vehicle. The system thus enables the driver of the vehicle to easily recognize a path from the current position of the vehicle to the target parking position. Herein, the vehicle is a vehicle on which the parking assist system is mounted.

However, the above-described conventional parking assist system only causes the driver of the vehicle to recognize the path from the current position of the vehicle to the target parking position but is not configured to cause the driver to recognize from which position the driver should start parking to reach the target parking position without performing steering operation during the parking action. Accordingly, the aforementioned conventional system does not provide adequate assistance for inexperienced drivers in driving operations.

DISCLOSURE OF INVENTION

The present invention draws a recommended parking start position which a vehicle can reach with a current value of steering angle of the vehicle unchanged and from which the vehicle can reach the target parking position with the steering angle being constant on an overhead image around the vehicle as a parking start frame figure and displays the overhead image with the parking start frame figure drawn thereon in such a manner that the position of the parking start frame figure on the overhead image varies with changes of the steering angle of the vehicle.

BEST MODE FOR CARRYING OUT THE INVENTION

A description is given of concrete embodiments of the present invention in detail below with reference to the drawings.

First Embodiment

Figure 1:
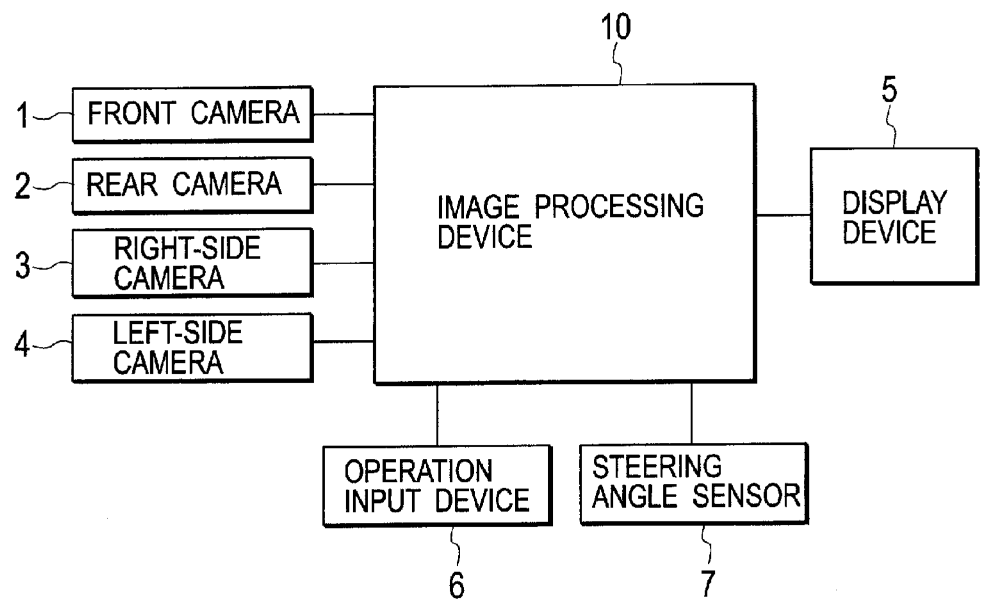
FIG. 1 is a block diagram showing a schematic configuration of a parking assist system to which the present invention is applied.

FIG. 1 is a block diagram showing a schematic configuration of a parking assist system to which the present invention is applied. The parking assist system of this embodiment displays an overhead image around a vehicle on which the system is mounted and assists a driver of the vehicle in performing a driving operation for parking. As shown in FIG. 1, four onboard cameras of a front camera 1, a rear camera 2, a right-side camera 3, and a left-side camera 4, which are mounted on the vehicle, are connected to inputs of an image processing device 10. An output of the image processing device 10 is connected to a display device 5 such as a liquid crystal display installed within a compartment of the vehicle. The image processing device 10 is connected to an operation input device 6 which receives operation inputs by the driver of the vehicle and is connected to a steering angle sensor 7 which detects steering angle of the vehicle. The display device 5 may be provided with a touch-panel type screen so that operations by the driver of the vehicle are inputted through the touch-panel type screen of the display device 5.

Figure 2:
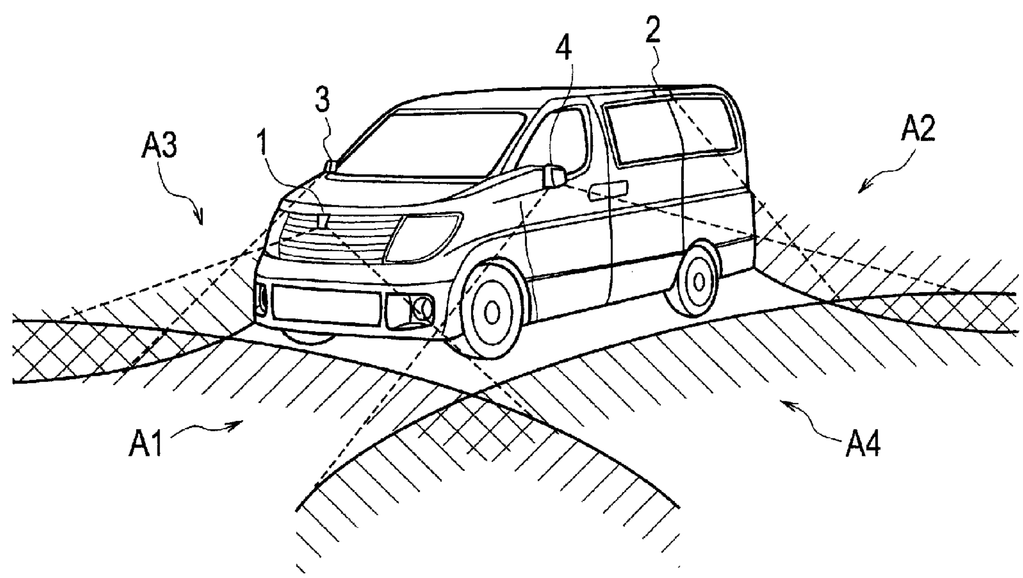
FIG. 2 is a view explaining positions of four onboard cameras and areas taken by the onboard cameras.

Each of the four onboard cameras of the front, rear, right-side, and left-side cameras 1 to 4 is composed of a wide-angle camera having an angle of view of about 180 degrees, for example. These four cameras are individually mounted at proper places of the vehicle so as to capture images of all the area surrounding the vehicle. Specifically, for example as shown in FIG. 2, the front camera 1 is installed at a front grille of the vehicle or the like and captures an image of an area A3 in front of the vehicle diagonally down towards the ground. The rear camera 2 is installed at a roof spoiler of the vehicle or the like and captures an image of an area A2 behind the vehicle diagonally down towards the ground. The right-side camera 3 is installed as a right-side mirror of the vehicle or the like and captures an image of an area A3 to the right of the vehicle diagonally down toward the ground. Moreover, the left-side camera 4 is installed at a left-side minor of the vehicle or the like and captures an image of an area A4 to the left of the vehicle diagonally downward toward the ground. These four onboard cameras output the captured images to the image processing device 10 as image signals.

Figure 3:
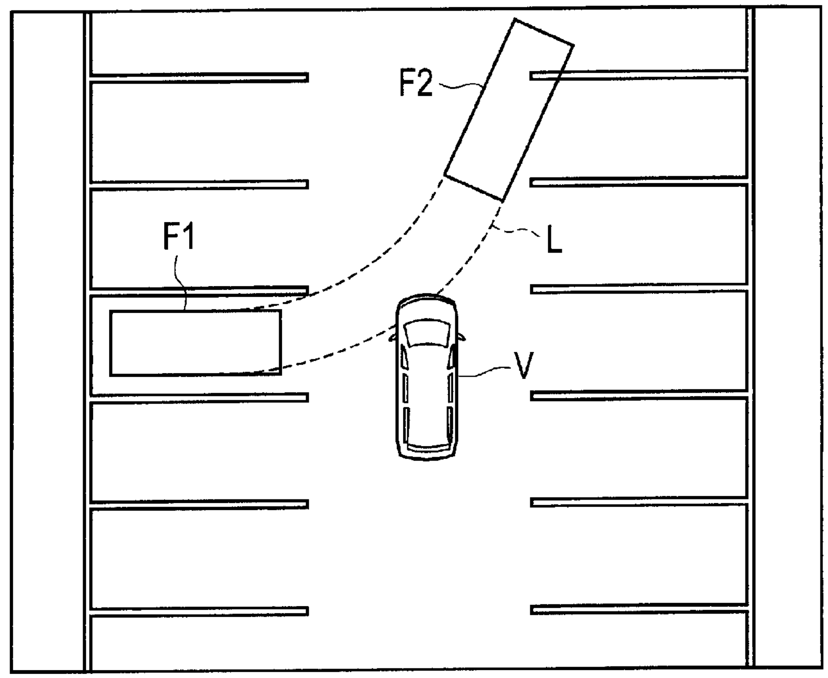
FIG. 3 is a view showing an example of an image displayed on a display device.
Figure 4:
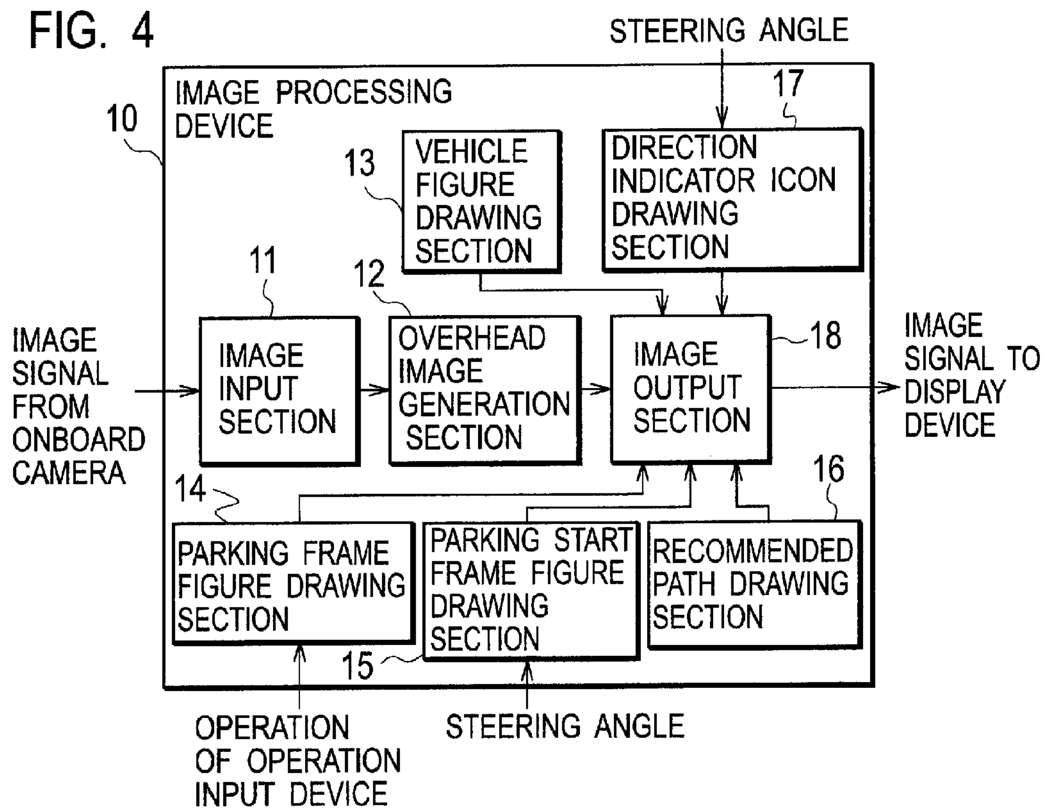
FIG. 4 is a block diagram showing a functional configuration of an image processing device.

The image processing device 10 is composed of an information processing device such as a microcomputer storing a program which processes images. The image processing device 10 executes this program with an arithmetic device such as a CPU to generate an image as shown in FIG. 3 to assist the driver of the vehicle in performing the driving operation for parking and display the generated image on the display device 5. In the functional configuration, the image processing device 10 includes an image input section 11, an overhead image generation section 12, a vehicle figure drawing section 13, a parking frame figure drawing section 14, a parking start frame figure drawing section 15, a recommended path drawing section 16, a direction indicator icon drawing section 17, and an image output section 18 as shown in FIG. 4.

The images captured by the four onboard cameras of the front, rear, right-side, and left-side cameras 1 to 4 are inputted to the image input section 11 of the image processing device 10. The image input section 11 stores the image signals from the four onboard cameras in frame memories by units of data constituting a single frame.

The images which are captured by the onboard cameras and stored in the frame memories are used by the overhead image generation section 12 to generate an overhead image. The overhead image generation section 12 performs viewing trans-formation for the images captured by the four onboard cameras into images of views from virtual viewpoints above the vehicle and joins the transformed images, thus generating an overhead image of an area around the vehicle viewed down from above. The generation of the overhead image by the overhead image generation section 12 is repeated at predetermined intervals (for example, at the same intervals as the onboard cameras capture images), and the image signals are stored in frame memories of the image output section 18 and updated as needed.

In the overhead image generated by the overhead image generation section 12, a vehicle figure V indicating a current position of the vehicle is drawn by the vehicle figure drawing section 13. The vehicle figure drawing section 13 holds a computer graphic image of a vehicle of the same size as that of the vehicle on the overhead image and draws the computer graphic image at the current position of the vehicle on the overhead image (usually at the center of the overhead image) as the vehicle figure V.

When the driver of the vehicle sets the target parking position using the operation input device 6, a parking frame figure F1 indicating the target parking position is drawn by the parking frame figure drawing section 14 on the overhead image generated by the overhead image generation section 12, and a parking start frame figure F2 indicating the recommended parking start position later described is drawn by the parking start frame figure drawing section 15. A recommended path L from the recommended parking start position to the target parking position at the parking action is then drawn by the recommended path drawing section 16.

According to the operation of the operation input device 6 by the driver of the vehicle, the parking frame figure drawing section 14 recognizes the position which is set as the target parking position on the overhead image and the direction thereof and draws a rectangular frame of the same size as that of the vehicle on the overhead image as the parking frame figure F1.

The parking start frame figure drawing section 15, based on information of current steering angle of the vehicle detected by the steering angle sensor 7, calculates as the recommended parking start position a position which the vehicle can reach with the steering angle of the vehicle unchanged from the detected current steering angle and the vehicle and from which the vehicle can reach the target parking position set by the driver of the vehicle with a constant steering angle. The parking start frame figure drawing section 15 draws a rectangular frame of the same size as that of the vehicle on the overhead image as the parking start frame figure F2.

Figure 5:
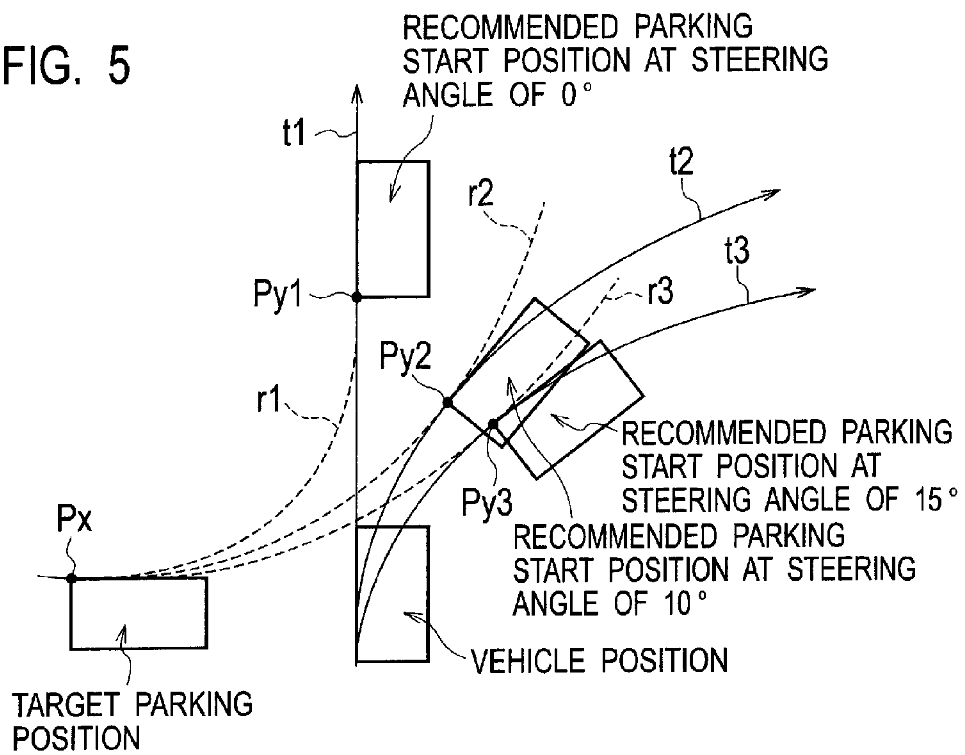
FIG. 5 is a view explaining an example of a method of calculating a recommended parking start position.

FIG. 5 is a view explaining an example of a method by which the parking start frame figure drawing section 15 calculates the recommended parking start position. The parking start frame figure drawing section 15 first calculates an predicted trajectory t of the vehicle moving with the current steering angle unchanged based on the information of the current steering angle of the vehicle detected by the steering angle sensor 7. In FIG. 5, t1, t2, and t3 indicate predicted trajectories when the steering angle is 0 degree, 10 degrees right, and 15 degrees right, respectively.

Subsequently, the parking start frame figure drawing section 15 sets a referential point Px of the target parking position (for example, a point at which a corner of the parking frame figure F1 is located) and calculates an arc (or a line) r which is tangent to the predicted trajectory t of the vehicle moving with the current steering angle unchanged and passes through the referential point Px of the target parking position. In FIG. 5, arcs tangent to the predicted trajectories t1 to t3 are indicated by r1 to r3, respectively.

The parking start frame figure drawing section 15 calculates a point Py of tangency between the arc (or line) r and predicted trajectory t and calculates the recommended parking start position based on the point Py of tangency as the referential point. In FIG. 5, points of tangency between the arcs r1 and individual predicted trajectories t1 to t3 are indicated by Py1 to Py3, respectively.

The parking start frame figure drawing section 15 draws, as the parking start frame figure F2, a rectangular frame of the same size as the vehicle on the overhead image at the recommended parking start position on the overhead image calculated by the aforementioned method. Herein, the recommended parking start position is calculated according to the current steering angle of the vehicle as described above. Accordingly, if the driver of the vehicle operates the steering wheel to change the steering angle, the position of the parking start frame F2 on the overhead image correspondingly changes. For example, in the example shown in FIG. 5, when the driver of the vehicle turns the steering wheel clockwise to change the steering angle from 0 to 10 degrees right, the position of the parking start frame figure F2 on the overhead image changes from the position including the point Py1 of tangency as the referential point to the position including the point Py2 of tangency as the referential point. When the driver of the vehicle further turns the steering wheel clockwise to change the steering angle from 10 to 15 degrees right, the position of the parking start frame figure F2 drawn on the overhead image is changed from the position including the point Py2 of tangency as the referential point to the position including the point Py3 of tangency as the referential point.

The recommended path drawing section 16 specifies a path through which the vehicle reaches the target parking position set by the driver of the vehicle from the recommended parking start position calculated by the parking start frame figure drawing section 15 with a constant steering angle. The recommended path drawing section 16 then draws lines as the recommended path L along the specified path on the overhead image.

As described above, the image signal of the image which includes the vehicle figure V, parking frame figure F1, parking start frame figure F2, and recommended path L drawn on the overview image generated by the overview image generation section 12 is read out from the frame memory by the image output section 18 as needed and outputted to the display device 5. On the display device 5, the image shown in FIG. 3 is always updated and displayed as a moving image. The driver of the vehicle sees the image displayed on the display device 5 and can recognize the recommended parking start position, from which the vehicle can reach the target parking position with a constant steering angle, or a position at which the driver should start the parking action to reach the target parking position without performing the steering operation during the parking action. The driver moves the vehicle to the recommended parking start position and then starts the parking action, thus extremely facilitating the driving operation for parking. The parking start frame figure F2 indicating the recommended parking start position is especially displayed with the position on the overhead image varied with changes in steering angle due to the steering operation by the driver of the vehicle. Accordingly, the driver of the vehicle operates the steering wheel while checking the condition around the vehicle displayed in the overhead image to move the parking start frame figure F2 to an optimal position, thus easily parking the vehicle from the optical position.

Meanwhile, the parking start frame F2 on the overhead image is for the purpose of causing the driver of the vehicle to recognize the recommended parking start position. Accordingly, the parking start frame F2 does not need to be displayed after the vehicle reaches the recommended parking start position. On the other hand, when the vehicle starts the parking action after reaching the recommended parking start position, the driver needs to turn again the steering wheel to the steering angle allowing the vehicle to move from the recommended parking start position to the target parking position along the recommended path L. It is therefore desirable to cause the driver of the vehicle to recognize the steering direction.

Figure 6:
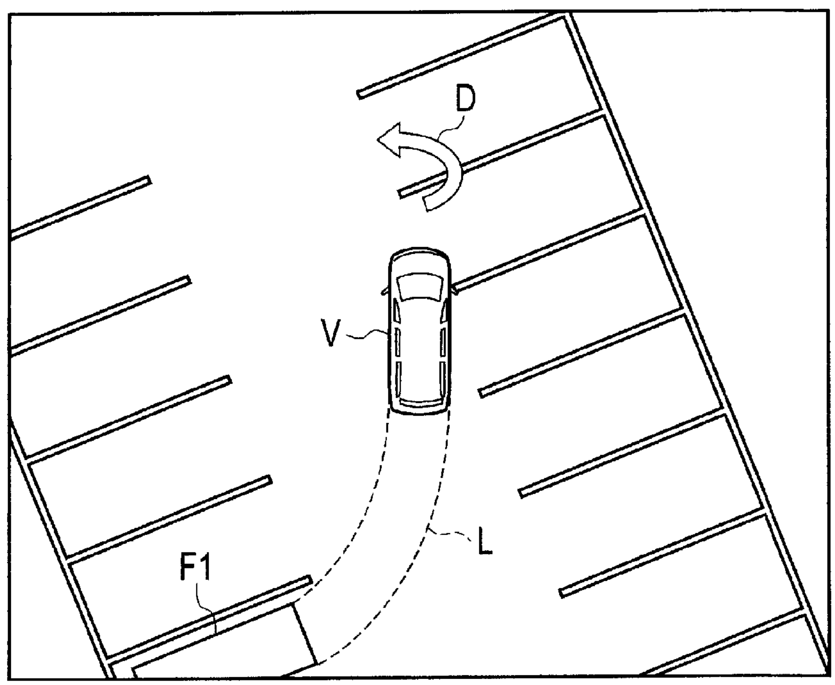
FIG. 6 is a view showing an example of an image which is displayed on the display device when a vehicle on which the system is mounted reaches the recommended parking start position.

In the parking assist system of this embodiment, therefore, the image processing device 10 is configured to judge whether the vehicle reaches the recommended parking start position by judging whether the position of the vehicle matches the recommended parking start position on the overhead image. When the vehicle reaches the recommended parking start position, the drawing of the parking start frame figure F2 by the parking start frame figure drawing section 15 is terminated, and a direction indicator icon D, which indicates the steering direction allowing the vehicle to reach the target parking position from the recommended parking start position, is drawn on the overhead image by the direction indicator icon drawing section 17. Accordingly, when the vehicle reaches the recommended parking start position, for example, an image shown in FIG. 6 is displayed on the display device 5.

The direction indicator icon drawing section 17 calculates an amount of necessary steering operation and the direction of the same based on a relationship between the current steering angle of the vehicle detected by the steering angle sensor 7 and the steering angle allowing the vehicle to move from the recommended parking start position to the target parking position along the recommended path L. The direction indicator icon drawing section 17 draws an arrow figure corresponding to the calculated direction of the steering operation near the vehicle figure V on the overhead image as the direction indicator icon D. Moreover, the direction indicator icon drawing section 17 monitors the steering angle of the vehicle detected by the steering angle sensor 7 while drawing the direction indicator icon D on the overhead image. The direction indicator icon drawing section 17 finishes drawing the direction indicator icon D when judging that the current steering angle of the vehicle is equal to the steering angle allowing the vehicle to move from the recommended parking start position to the target parking position along the recommended path L.

Figure 7:
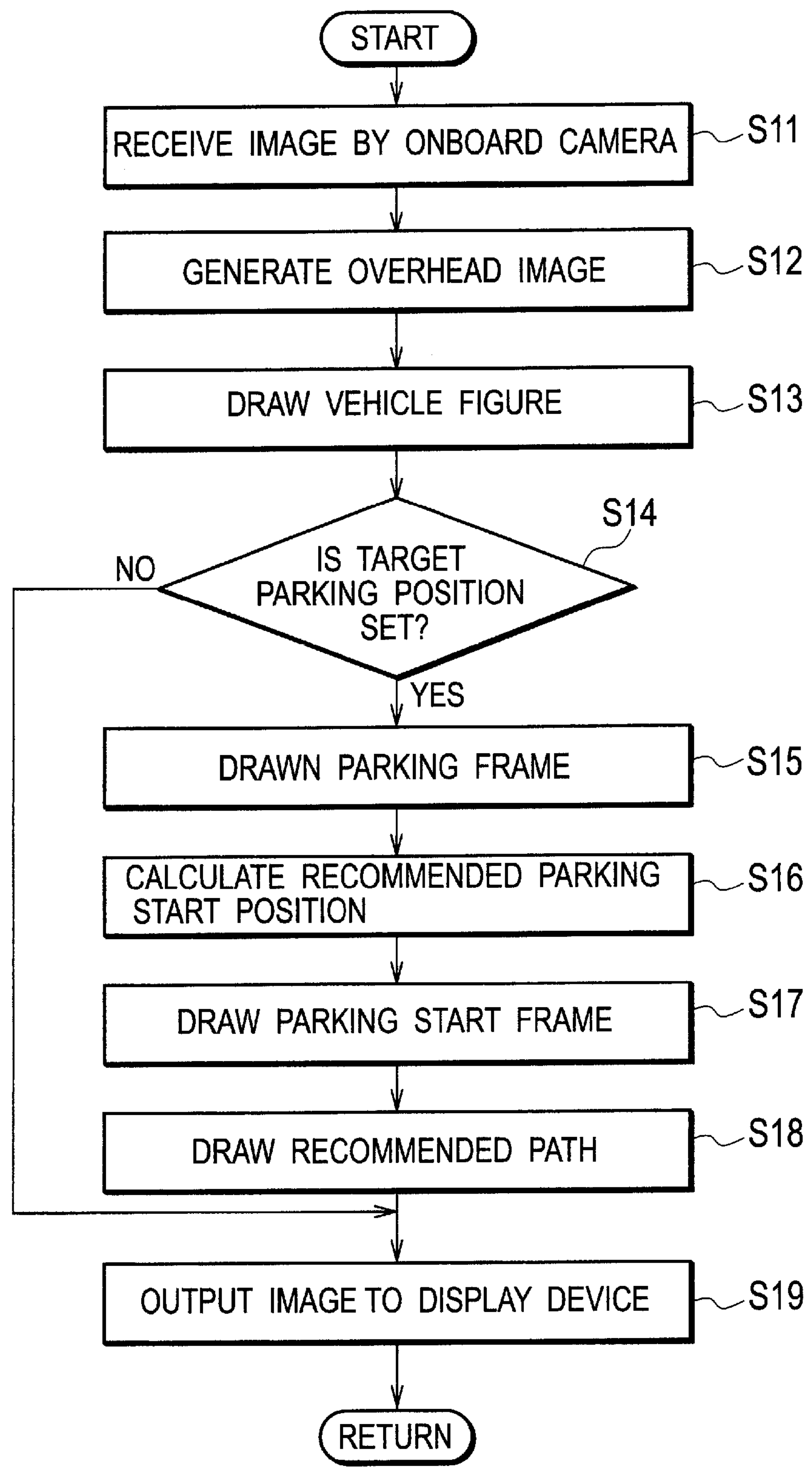
FIG. 7 is a flowchart showing a flow of a series of steps executed by the image processing device with a predetermined period until the vehicle reaches the recommended parking start position after the parking assist system is activated.
Figure 8:
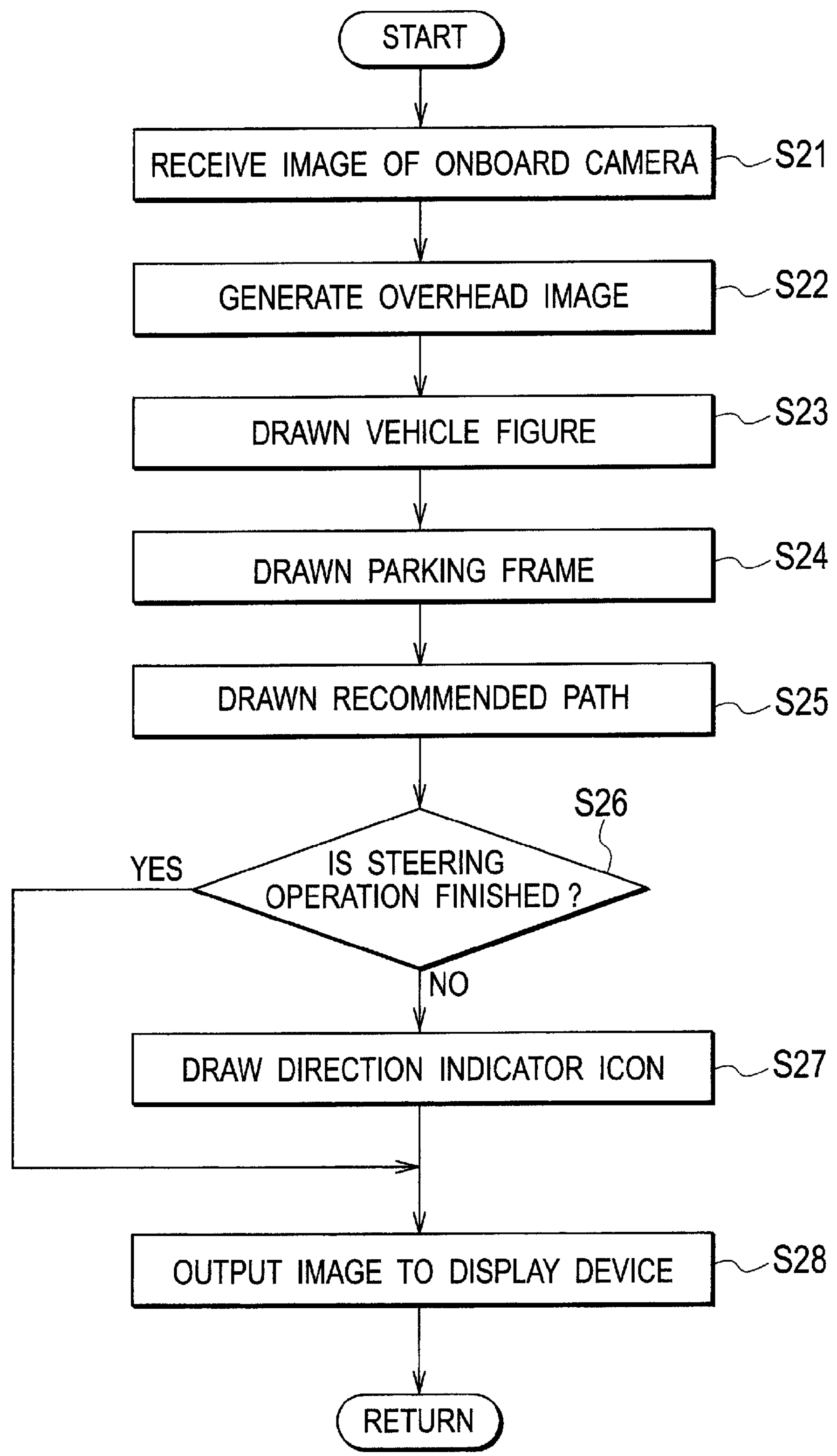
FIG. 8 is a flowchart showing a flow of a series of steps executed by the image processing device with a predetermined period until the vehicle reaches the target parking position after the vehicle reaches the recommended parking start position.

FIG. 7 is a flowchart showing a flow of a series of steps executed with a predetermined period (for example, a capture period of the onboard cameras) by the image processing device 10 until the vehicle reaches the recommended parking start position after the parking assist system is started upon a switching operation by the driver of the vehicle, for example. FIG. 8 is a flowchart showing a flow of a series of steps executed with a predetermined period (for example, the capture period of the onboard cameras) by the image processing device 10 until the vehicle reaches the target parking position after the vehicle reaches the recommended parking start position.

When the parking assist system is started, as shown in FIG. 7, at first, the images captured by the four onboard cameras of the front, rear, right-side, and left-side cameras 1 to 4 are inputted into the image input section 11 of the image processing device 10 and stored in the frame memories in step S11. Next, in step S12, using these images captured by the four onboard cameras, the overhead image of a downward view around the vehicle is generated and stored in the frame memory of the image output section 18 by the overhead image generation section 12. In step S13, at the current position of the vehicle on the overhead image generated in the step S12, the vehicle figure V is drawn by the vehicle figure drawing section 13.

Next, in step S14, it is judged whether the target parking position is set by the driver of the vehicle. When the target parking position is not set, the process proceeds to step S19, and the image including only the vehicle figure V drawn on the overhead image around the vehicle is outputted to the display device 5 by the image output section 18 and is displayed on the display device 5.

On the other hand, when the target parking position is set, next, in step in S15, the parking frame figure F1 is drawn by the parking frame figure drawing section 14 at the target parking position on the overhead image generated in the step S12. Next, in step S16, the recommended parking start position, from which the vehicle can reach the target parking position with a constant steering angle, is calculated by the parking start frame figure drawing section 15. In step S17, the parking start frame F2 is drawn at the recommended parking start position on the overhead image generated in the step S12. Furthermore, in step S18, the recommended path L of the vehicle at the parking action from the recommended parking start position to the target parking position is drawn on the overhead image generated in the step S12 by the recommended path drawing section 16. In step S19, the image including the vehicle figure V, parking frame figure F1, parking start frame figure F2, and recommended path L drawn on the overhead image around the vehicle is outputted to the display device 5 by the image output section 18 and displayed on the display device 5.

After the vehicle reaches the recommended parking start position, as shown in FIG. 8, in step S21, the images captured by the four onboard cameras of the front, rear, right-side, and left-side cameras 1 to 4 are inputted into the image input section 11. In step S22, the overhead image is generated from these images captured by the four onboard cameras by the overhead image generation section 12. In step S23, the vehicle figure V is drawn by the vehicle figure drawing section 13 on the overhead image generated in the step S22, and in step S24, the parking frame figure F1 is drawn by the parking frame drawing section 14 on the overhead image generated in the step S22. In step S25, the recommended path L to the target parking position is drawn by the recommended path drawing section 16 on the overhead image.

Next, in step S26, it is judged by the direction indicator icon drawing section 17 whether the steering operation to set the steering angle of the vehicle to the steering angle allowing the vehicle to reach the target parking position along the recommended path L is finished. When the steering operation is not finished yet, in step S27, the direction indicator icon D is further drawn on the overhead image drawn in the step S22. In step S28, then, the image including the vehicle figure V, parking frame figure F1, recommended path L, and direction indicator icon D (when the steering operation is not finished yet) drawn on the overhead image around the vehicle is outputted by the image output section 18 to the display device 5 and is displayed on the display device 5.

As described in detail with the concrete examples, when the target parking position is set by the driver of the vehicle, the parking assist system of this embodiment calculates the recommended parking start position, which the vehicle can reach with the steering angle of the vehicle unchanged and from which the vehicle can reach the target parking position with a constant steering angle. The parking assist system displays on the display device 5 the parking start frame figure F2, which indicates the recommended parking start position and is drawn on the overhead image around the vehicle in addition to the vehicle figure V indicating the current position of the vehicle and the parking frame figure F1 indicating the target parking position. According to the parking assist system, it is therefore possible to allow the driver of the vehicle to recognize the position from which the driver should start the parking action in order to easily reach the target parking position. The parking assist system of this embodiment can effectively assist especially inexperienced drivers in performing the driving operation for parking.

Moreover, according to the parking assist system of this embodiment, the recommended path L, through which the vehicle can reach the recommended parking start position to the target parking position with a constant steering angle, is drawn on the overhead image around the vehicle. Accordingly, it is possible to allow the driver to recognize the path of the vehicle for the actual parking action. For example, when the recommended path L is overlapped with an obstacle or the like displayed on the overhead image, the parking assist system can prompt the driver of the vehicle to take measures such as changing the recommended parking start position.

Still moreover, according to the parking assist system of this embodiment, the direction indicator icon D indicating the steering direction allowing the vehicle to reach the target parking position from the recommended parking start position is further drawn on the overview image. Accordingly, it is possible to allow the driver of the vehicle to recognize the steering operation which is required at the recommended parking start position, thus providing more effective assistance for the driving operation at parking. In this embodiment, the driver of the vehicle is caused to recognize the steering operation required at the recommended parking start position by drawing the direction indicator icon D on the overhead image. However, it is effective to display a message such as “Turn the steering wheel to the right” on the display device 5 or speak such a message instead of or in addition to the direction indicator icon D.

Second Embodiment

Figure 9:
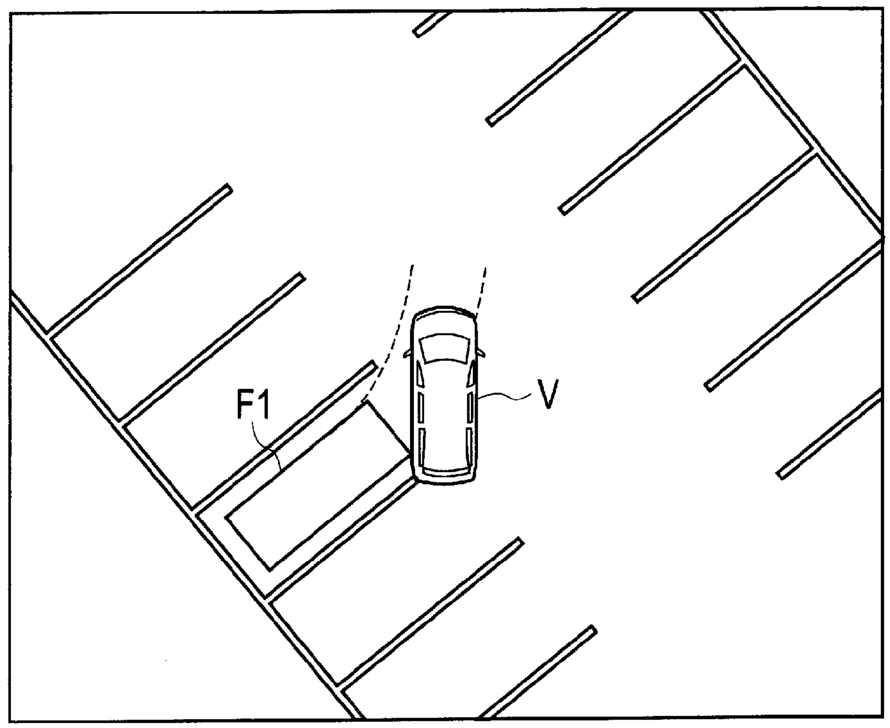
FIG. 9 is a view explaining a situation where the path of the vehicle is deviated from a recommended path during the parking action, showing an example of an image displayed on the display device at that time.
Figure 10:
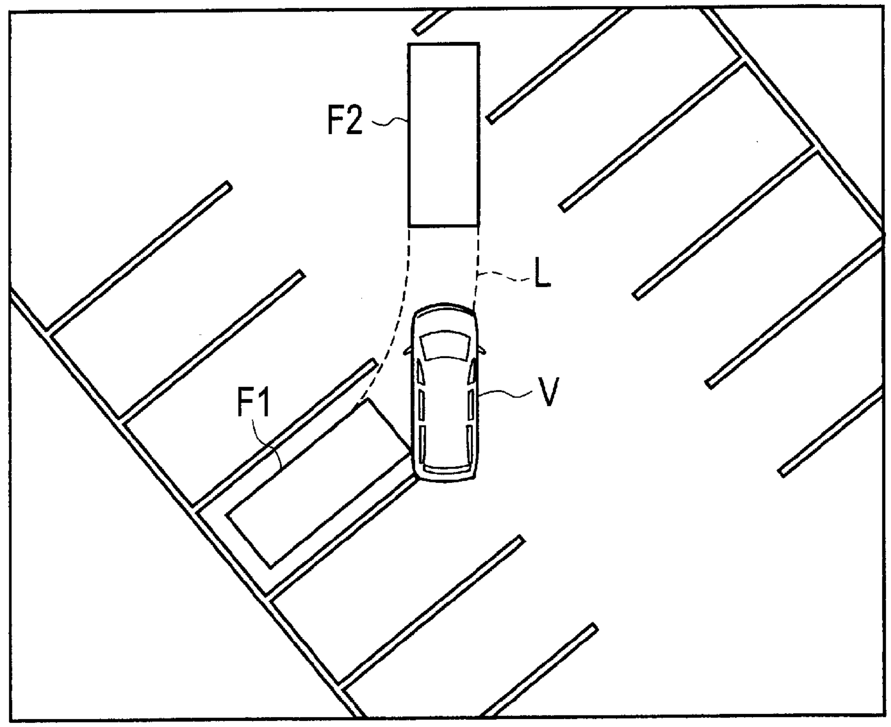
FIG. 10 is a view showing an example of an image displayed on the display device when the vehicle stops the parking action.

Next, a description is given of a second embodiment of the present invention with reference to FIGS. 9 and 10.

In the first embodiment, calculation of the recommended parking start position and drawing of the parking start frame figure F2 are terminated when the vehicle reaches the recommended parking start position on the premise that the vehicle which has reached the recommended parking start position reaches the target parking position along the recommended path L. However, in actual parking action, the driver may perform a steering operation by an accidental cause or unconsciously perform a steering operation. Accordingly, it could be that the path of the vehicle is deviated from the recommended path L and does not accurately reach the target parking position. In such a case, it is necessary to once stop the parking action and start another parking action to cause the vehicle to accurately reach another target parking position. Accordingly, in this embodiment, after the vehicle reaches the recommended parking start position and the calculation of the recommended parking start position and the drawing of the parking start frame figure F2 are terminated, when it is judged that the parking action of the vehicle is stopped, the calculation of the recommended parking start position and the drawing of the parking start frame figure F2 are started again.

The configuration of the parking assist system of this embodiment is the same as that of the first embodiment shown in FIG. 4. The basic part of the processes implemented by the individual functional constitutions of the image processing system 10 is the same as that of the first embodiment. In this embodiment, for example, it is judged based on stop of the vehicle, gear change, or the like before the vehicle reaches the target parking position whether the parking action is stopped. When the parking action of the vehicle is stopped, the parking start frame figure drawing section 15 of the image processing device 10 starts again the calculation of the recommended parking start position and the drawing of the parking start frame figure F2.

To be described with a concrete example, for example, it is assumed that after the vehicle starts the parking action from the state shown in FIG. 6, the steering angle is changed by any cause before the vehicle reaches the target parking position to deviate the path of the vehicle from the recommended path L as shown in FIG. 9. At this time, when the driver of the vehicle stops the vehicle and changes gears, it is judged that the parking action of the vehicle is stopped, and the calculation of the recommended parking start position and the drawing of the parking start frame figure F2 are started again.

Specifically, when it is judged that the parking action of the vehicle is stopped, the parking start frame figure drawing section 15 of the image processing device 10 calculates the position which the vehicle can reach with the current steering angle unchanged and from which the vehicle can reach the already set target parking position with a constant steering angle as a new recommended parking start position based on information on a current steering angle of the vehicle detected by the steering angle sensor 7. The parking start frame figure drawing section 15 then draws the parking start frame figure F2 at a position corresponding to the new parking start position on the overhead image generated by the overhead image generation section 12. The concrete method of calculating the new recommended parking start position is the same as that of the first embodiment.

After the new recommended parking start position is calculated by the parking start frame drawing section 15, the recommended path drawing section 16 draws on the overhead image a new recommended path L through which the vehicle can reach the target parking position from the new recommended parking start position with a constant steering angle. On the display device 5, the image including the vehicle figure V, parking frame figure F1, parking start frame figure F2, and recommended path L drawn on the overhead image is displayed again as shown in FIG. 10, for example. The driver of the vehicle moves the vehicle to the recommended parking start position while seeing the displayed image and then starts the parking action again. Accordingly, the driver of the vehicle can extremely easily perform the driving operation for parking.

As described above, according to the parking assist system of this embodiment, when the parking action of the vehicle is stopped, the parking start frame figure drawing section 15 of the image processing device 10 starts again the calculation of the new recommended parking start position and the drawing of the parking start frame figure F2. Accordingly, at the parking action started again, it is also possible to allow the driver of the vehicle to recognize from which position to start the parking action in order to easily reach the target parking position, thus providing more effective assistance to the driving operation for parking.

Third Embodiment

Figure 11:
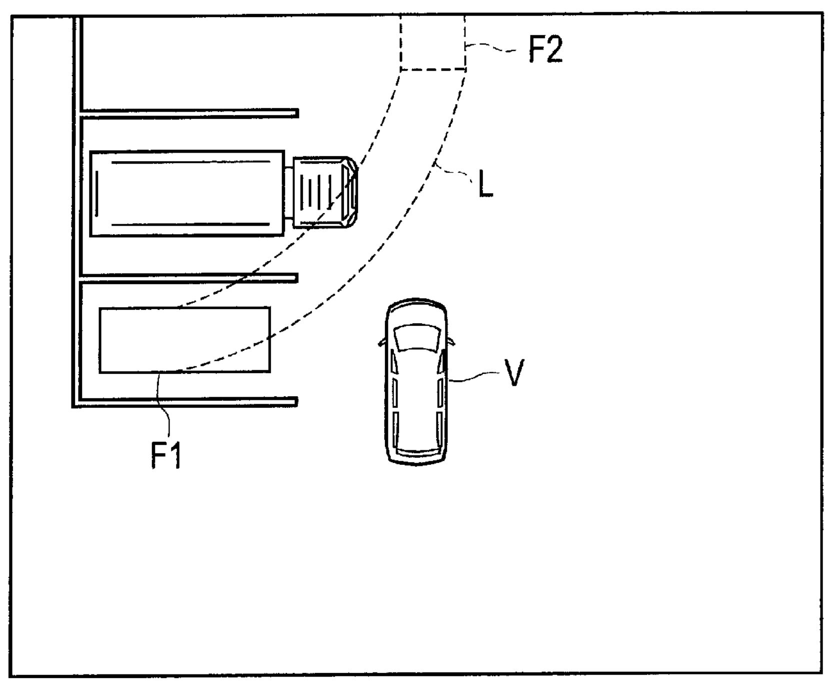
FIG. 11 is a view showing an example of an image displayed on the display device when there is an obstacle on a path from the recommended parking start position to the target parking position.
Figure 12:
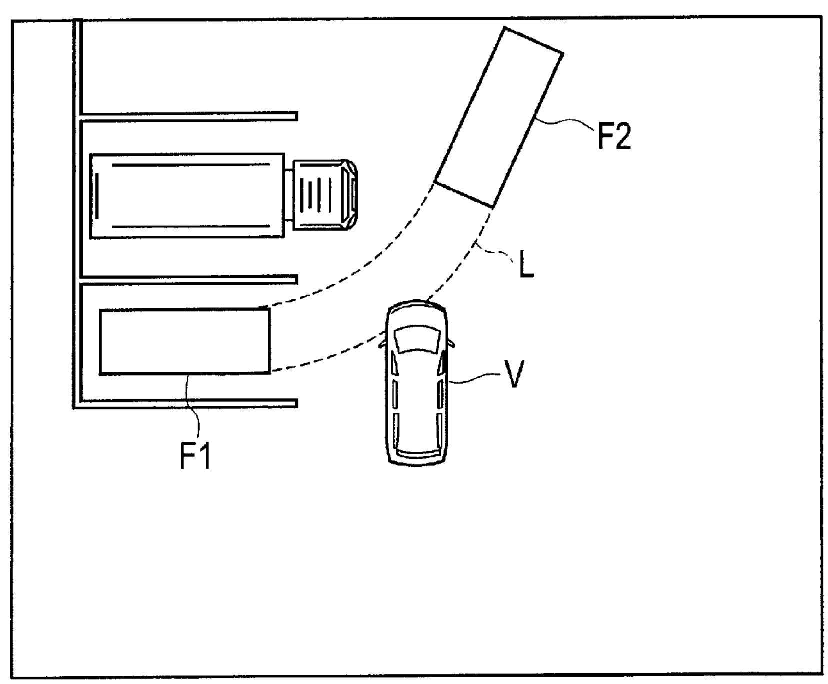
FIG. 12 is a view showing an example of an image displayed on the display device when there is no obstacle on the path from the recommended parking start position to the target parking position.

Next, a description is given of a third embodiment of the present invention with reference to FIGS. 11 and 12.

In this embodiment, the parking start frame figure F2 drawn on the overhead image varies depending on the presence of an obstacle on a path from the recommended parking start position to the target parking position.

The configuration of the parking assist system of this embodiment is the same as that of the first embodiment shown in FIG. 4, and the basic part of the processes implemented by the individual functional constitutions of the image processing device 10 is also the same as that of the first embodiment. However, in this embodiment, after calculating the recommended parking start frame position based on the current steering angle of the vehicle, the parking start frame figure drawing section 15 of the image processing device 10 judges whether there is an obstacle on the path from the calculated recommended parking start position to the target parking position. The parking start frame figure drawing section 15 draws the parking start frame figure F2 in different forms depending on the presence or absence of an obstacle on the path from the recommended parking start position to the target parking position.

Herein, the presence of an obstacle on the path from the recommended parking start position to the target parking position can be judged based on the positional relationship between the obstacle and the path from the recommended parking start position to the target parking position by, for example, when the vehicle includes an obstacle sensor such as an ultrasonic sensor, specifying the position of the obstacle based on a sensor signal of the obstacle sensor. Alternatively, the presence of an obstacle can be also judged based on the positional relationship between the obstacle and the path from the recommended parking start position to the target parking position by analyzing the images captured by the onboard cameras and specifying the position of the obstacle.

As for the variations of the form of the parking start frame figure F2, the type of lines of the frame of the parking start frame figure F2 can be varied. For example, when there is an obstacle on the path from the recommended parking start position to the target parking position, the parking start frame figure F2 is drawn as a dashed frame as shown in FIG. 11, and when there is no obstacle on the path from the recommended parking start position to the target parking position, the parking start frame figure F2 is drawn as a solid frame as shown in FIG. 12. Alternatively, thickness of the lines of the parking start frame figure F2 can be varied. When there is an obstacle on the path from the recommended parking start position to the target parking position, the parking start frame figure F2 is drawn with thin lines, and when there is no obstacle on the path from the recommended parking start position to the target parking position, the parking start frame figure F2 is drawn with thick lines. In addition, it is also effective that color of the parking start frame FIG. 2 is varied depending on the presence or absence of an obstacle on the path between the recommended parking start position and the target parking position.

As described above, according to the parking assist system of this embodiment, the parking start frame figure drawing section 15 of the image processing device 10 judges whether there is an obstacle on the path from the calculated recommended parking start position to the target parking position and draws the parking start frame figure F2 on the overhead image in different forms depending on the presence or absence of an obstacle. It is therefore possible to allow the driver of the vehicle to easily recognize whether to start the parking action from the recommended parking start position corresponding to the current steering angle. When there is a possibility that the vehicle comes into contact with an obstacle during the parking action, the parking assist system of this embodiment can prompt the driver of the vehicle to perform a steering operation to change the recommended parking start position to an optimal position.

Hereinabove, the description is given showing the first to third embodiments as the concrete examples of the parking assist system to which the present invention is applied. However, the above-described embodiments are just application examples of the present invention and are not intended to limit the technical scope of the present invention to the contents described in the above embodiments. The technical scope of the present invention is not limited to the specific technical matters disclosed in the aforementioned embodiments and includes various changes, modifications, alternatives, and the like which can be easily derived from this disclosure.

INDUSTRIAL APPLICABILITY

The present invention is applicable to a technique assisting a driver in performing driving operation at parking a vehicle.

The invention claimed is:

1. A parking assist system, comprising:

imaging units capturing images around a vehicle on which the parking assist system is mounted;

an overhead image generating unit generating an overhead image viewed down from above the vehicle by joining the images captured by the imaging units; and a display unit displaying the generated overhead image, a parking frame figure corresponding to a target parking position as a parking target of the vehicle, and a backward parking start frame figure corresponding to a recommended backward parking start position for switching a direction of motion of the vehicle from forward to backward and starting backward movement to the target parking position for parking the vehicle, wherein position of the backward parking start frame figure on the overhead image changes corresponding to change in a steering angle of the vehicle.

2. The parking assist system according to claim 1, further comprising:

a recommended parking start position calculation unit calculating as the recommended backward parking start position a position which the vehicle can reach with a current value of the steering angle of the vehicle unchanged and from which the vehicle can reach the target parking position with the steering angle being constant; and a figure drawing unit drawing the backward parking start frame figure at the recommended backward parking start position on the generated overhead image.

3. The parking assist system according to claim 2, wherein the recommended parking start position calculation unit calculates a predicted trajectory of the vehicle moving with the current value of the steering angle unchanged; calculates an arc or line which is tangent to the predicted trajectory and passes through a referential point of the target parking position; and then obtains a position whose referential point is a tangent point between the arc or line and the predicted trajectory as the recommended parking start position.

4. The parking assist system according to claim 2, wherein the recommended parking start position calculation unit terminates the calculation of the recommended backward parking start position and the figure drawing unit terminates the drawing of the backward parking start frame figure when the vehicle reaches the recommended backward parking start position.

5. The parking assist system according to claim 4, wherein the recommended parking start position calculation unit starts again the calculation of the recommended backward parking start position and the figure drawing unit starts again the drawing of the backward parking start frame figure when the vehicle stops a parking action from the recommended backward parking start position.

6. The parking assist system according to claim 2, wherein the figure drawing unit judges whether there is an obstacle on a path from the calculated recommended backward parking start position to the target parking position and draws the backward parking start frame figure in different forms depending on presence or absence of the obstacle.

7. The parking assist system according to claim 1, further comprising:

a recommended path drawing unit drawing on the overhead image a recommended path for a parking action from the recommended backward parking start position to the parking target position.

8. The parking assist system according to claim 1, further comprising:

a direction indicator icon drawing unit which, when the vehicle reaches the recommended backward parking start position, draws on the overhead image, an icon indicating a direction of steering operation to achieve a steering angle at a parking action from the recommended backward parking start position to the target parking position.

9. A parking assist method, comprising:

capturing images around a vehicle and generating an overhead image viewed down from above the vehicle by joining the captured images;

displaying the generated overhead image, a parking frame figure corresponding to a target parking position as a parking target of the vehicle, and a backward parking start frame figure corresponding to a recommended backward parking start position for switching a direction of motion of the vehicle from forward to backward and starting backward movement to the target parking position for parking the vehicle; and changing position of the backward parking start frame figure on the overhead image corresponding to change in a steering angle of the vehicle.

10. A parking assist system, comprising:

imaging units capturing images around a vehicle;

an overhead image generating unit generating an overhead image viewed down from above the vehicle by joining the images captured by the imaging units; and a display unit displaying the generated overhead image, a parking frame figure corresponding to a target parking position as a parking target of the vehicle, a vehicle figure indicating a current position of the vehicle, and a backward parking start frame figure corresponding to a recommended backward parking start position for switching a direction of motion of the vehicle from forward to backward and starting backward movement to the target parking position for parking the vehicle, wherein position of the backward parking start frame figure on the overhead image changes corresponding to change in a steering angle of the vehicle.

* * * * *